US012794773B2

(12) United States Patent
Woodworth et al.

(10) Patent No.: US 12,794,773 B2
(45) **Date of Patent: *Nov. 10, 2026**

(54) SYSTEMS AND METHODS FOR CONTROLLING THE DEPLOYMENT OF NETWORK CONFIGURATION CHANGES BASED ON WEIGHTED IMPACT

(71) Applicant: CenturyLink Intellectual Property LLC, Denver, CO (US)

(72) Inventors: John R. B. Woodworth, Amissville, VA (US); Dean Ballew, Sterling, VA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 117 days.

This patent is subject to a terminal disclaimer.

(21) Appl. No.: 18/956,980

(22) Filed: Nov. 22, 2024

(65) Prior Publication Data

US 2025/0088419 A1 Mar. 13, 2025

Related U.S. Application Data

(63) Continuation of application No. 18/511,411, filed on Nov. 16, 2023, now Pat. No. 12,155,529, which is a continuation of application No. 17/959,656, filed on Oct. 4, 2022, now Pat. No. 11,824,716.

(60) Provisional application No. 63/266,267, filed on Dec. 30, 2021.

(51) Int. Cl.

| | |
|---|---|
| ***H04L 41/0823*** | (2022.01) |
| ***H04L 41/08*** | (2022.01) |
| ***H04L 41/16*** | (2022.01) |

(52) U.S. Cl.
CPC ...... *H04L 41/0836* (2013.01); *H04L 41/0883* (2013.01); *H04L 41/16* (2013.01)

(58) Field of Classification Search
CPC . H04L 41/0836; H04L 41/0883; H04L 41/16; H04L 41/0886; H04L 41/0816
USPC .......................................................... 709/231
See application file for complete search history.

(56) References Cited

U.S. PATENT DOCUMENTS

| | | | | |
|---|---|---|---|---|
| 10,776,441 | B1 | 9/2020 | Echeverria | |
| 11,049,058 | B2 | 6/2021 | Aasoori | |
| 11,163,669 | B1 | 11/2021 | Torun | |
| 11,422,790 | B1 | 8/2022 | Zahn | |
| 11,425,054 | B1 | 8/2022 | Dunsmore | |
| 11,595,243 | B1 | 2/2023 | Schreiber | |
| 11,599,813 | B1 | 3/2023 | Yuan | |
| 11,632,360 | B1 | 4/2023 | Tan | |
| 12,381,876 | B2 * | 8/2025 | Jeffords | G06F 21/604 |
| 2017/0034023 | A1 | 2/2017 | Nickolov | |
| 2017/0344618 | A1 | 11/2017 | Horowitz | |

(Continued)

*Primary Examiner* — Karen C Tang

(57) ABSTRACT

A method for controlling deployment of network configuration changes includes receiving, by centralized network management system executed by a processor and memory, configuration change instructions to alter a configuration of a network; computing, by the centralized network management system, a weighted impact of the configuration change instructions; determining, by the centralized network management system, whether the weighted impact of the configuration change instructions exceeds a threshold impact level; and in response to determining that the weighted impact does not exceed the threshold impact level, executing the configuration change instructions.

11 Claims, 6 Drawing Sheets

(56) References Cited

U.S. PATENT DOCUMENTS

| | | | |
|---|---|---|---|
| 2018/0131574 | A1 | 5/2018 | Jacobs |
| 2020/0067861 | A1 | 2/2020 | Leddy |
| 2020/0394332 | A1 | 12/2020 | Jakobsson |
| 2020/0409825 | A1 | 12/2020 | Balasubramanian |
| 2021/0067406 | A1 | 3/2021 | Myers |
| 2021/0110343 | A1 | 4/2021 | Lagneaux |
| 2021/0302953 | A1 | 9/2021 | Zhou |
| 2022/0123797 | A1 | 4/2022 | Files |
| 2022/0222066 | A1 | 7/2022 | Franzen |
| 2022/0247630 | A1* | 8/2022 | Engi .................... H04L 41/0627 |
| 2022/0283793 | A1 | 9/2022 | DeMarne |
| 2022/0353801 | A1 | 11/2022 | Misra |
| 2022/0393952 | A1 | 12/2022 | Mortsolf |
| 2023/0078246 | A1 | 3/2023 | Koodli |
| 2023/0103011 | A1 | 3/2023 | Zaroo |
| 2023/0123781 | A1 | 4/2023 | Kaimal |
| 2023/0216738 | A1 | 7/2023 | Woodworth |
| 2023/0237165 | A1 | 7/2023 | Prasad |
| 2024/0089174 | A1 | 3/2024 | Woodworth |

* cited by examiner

SYSTEMS AND METHODS FOR CONTROLLING THE DEPLOYMENT OF NETWORK CONFIGURATION CHANGES BASED ON WEIGHTED IMPACT

FIELD

Aspects of embodiments of the present disclosure relate to systems and methods for managing the configuration of communications networks such as computer networks.

BACKGROUND

Administrative and management operations in computer networks are commonly automated using centralized software deployment systems and/or network management systems. For example, network hardware such as routers and switches and network software such as telephony, authentication, and directory services, web applications, and data stores, may all be centrally configured through one or more centralized network configuration management and application deployment systems such as Ansible®, Puppet®, network management software (NMS) such as software provided by SolarWinds®, or other deployment and rollout managers.

These centralized software and network management systems allow users (e.g., network engineers) to maintain and control the configuration of software systems and network hardware (including software defined networking or SDN hardware) using machine-readable definition files (e.g., configuration scripts or declarative definitions), rather than physical hardware configuration (e.g., physically connecting wires to particular ports, connecting network hardware in particular configurations, and/or manually installing software on particular computing devices). This is sometimes referred to as infrastructure-as-code (IaC) or infrastructure-as-software (IaS).

Centralized network operations and management systems improve the efficiency and responsiveness of network maintenance operations because changes to networks can often be deployed without requiring engineers to be on-site to physically reconfigure hardware devices and because these changes can be deployed quickly and automatically across large wide geographic areas without the need to coordinate the activities of engineers physically located at the data centers or other network hardware in the network.

This responsiveness also enables rapid response to network threats, such as Distributed Denial of Service (DDOS) attacks from particular outsiders, undesired traffic originating from within the network (e.g., a collection of computers infected by a virus and participating in a botnet), or the like. Responses to these threats may include network filters to block traffic accessing particular ports or using particular protocols, the disconnection of particular subnets, and the like.

The above information disclosed in this Background section is only for enhancement of understanding of the present disclosure, and therefore it may contain information that does not form the prior art that is already known to a person of ordinary skill in the art.

SUMMARY

Aspects of embodiments of the present disclosure relate to systems and methods for automatically analyzing configuration changes made through centralized software and/or network management systems and detecting, prior to applying the configuration changes, that the configuration changes may impact important networks or large portions of the network. In some embodiments, systems and methods according to embodiments of the present disclosure detect circumstances where the configuration changes would negatively impact access to portions of the network or disable access to services within the network.

According to one embodiment of the present disclosure, a method for controlling deployment of network configuration changes includes receiving, by centralized network management system executed by a processor and memory, configuration change instructions to alter a configuration of a network; computing, by the centralized network management system, a weighted impact of the configuration change instructions; determining, by the centralized network management system, whether the weighted impact of the configuration change instructions exceeds a threshold impact level; and in response to determining that the weighted impact does not exceed the threshold impact level, executing the configuration change instructions.

The method may further include, in response to determining that the weighted impact exceeds the threshold impact level, denying the configuration change instructions.

The method may further include, in response to determining that the weighted impact exceeds the threshold impact level, escalating the configuration change instructions to a higher-level user account.

The method may further include: receiving an approval of the configuration change instructions from the higher-level user account; and executing the configuration change instructions based on the approval.

The method may further include: receiving a denial of the configuration change instructions from the higher-level user account; and denying the configuration change instructions based on the denial.

The method may further include: sending notification messages to accounts associated with parties responsible for network resources impacted by the configuration change instructions.

The weighted impact of the configuration change instructions may be computed by: determining one or more IP addresses or IP address ranges impacted by the configuration change instructions; comparing the one or more IP addresses or IP address ranges to a weighted list of IP addresses and IP address ranges to identify one or more matching IP addresses or IP address ranges; and computing the weighted impact based on one or more weights associated with the one or more matching IP addresses or IP address ranges.

The weighted impact of the configuration change instructions may be computed by supplying features extracted from the configuration change instructions to a trained machine learning model.

The trained machine learning model may be trained based on prior configuration change instructions and associated network traffic data collected after applying the prior configuration change instructions.

The trained machine learning model may be further trained based on one or more support tickets that were generated due to the prior configuration change instructions.

The method may further include: monitoring a plurality of network conditions of the network after executing the configuration change instructions; detecting a negative impact on the network conditions after the executing the configuration change instructions; determining whether to roll back the configuration change instructions; and rolling back the configuration change instructions in response to determining to roll back the configuration change instructions.

The method may further include: generating a support ticket in response to determining to refrain from rolling back the configuration change instructions.

According to one embodiment of the present disclosure, a system for controlling deployment of network configuration changes includes: a processor; and memory storing instructions that, when executed by the processor, cause the processor to: receive configuration change instructions to alter a configuration of a network; compute a weighted impact of the configuration change instructions; determine whether the weighted impact of the configuration change instructions exceeds a threshold impact level; and in response to determining that the weighted impact does not exceed the threshold impact level, execute the configuration change instructions.

The memory may further store instructions that, when executed by the processor cause the processor to, in response to determining that the weighted impact exceeds the threshold impact level, escalate the configuration change instructions to a higher-level user account.

The memory may further store instructions that, when executed by the processor cause the processor to: receive an approval of the configuration change instructions from the higher-level user account; and execute the configuration change instructions based on the approval.

The memory may further store instructions that, when executed by the processor cause the processor to: receive a denial of the configuration change instructions from the higher-level user account; and deny the configuration change instructions based on the denial.

The weighted impact of the configuration change instructions may be computed by: determining one or more IP addresses or IP address ranges impacted by the configuration change instructions; comparing the one or more IP addresses or IP address ranges to a weighted list of IP addresses and IP address ranges to identify one or more matching IP addresses or IP address ranges; and computing the weighted impact based on one or more weights associated with the one or more matching IP addresses or IP address ranges.

The weighted impact of the configuration change instructions may be computed by supplying features extracted from the configuration change instructions to a trained machine learning model.

The trained machine learning model may be trained based on prior configuration change instructions and associated network traffic data collected after applying the prior configuration change instructions.

The memory may further store instructions that, when executed by the processor cause the processor to: monitor a plurality of network conditions of the network after executing the configuration change instructions; detect a negative impact on the network conditions after the executing the configuration change instructions; determine whether to roll back the configuration change instructions; and roll back the configuration change instructions in response to determining to roll back the configuration change instructions; and generate a support ticket in response to determining to refrain from rolling back the configuration change instructions.

According to another aspect of the present disclosure, a method is provided comprising: receiving, by centralized network management system executed by a processor and memory, configuration change instructions to alter a configuration of a network; computing, by the centralized network management system, a weighted impact of the configuration change instructions by: determining one or more IP addresses or IP address ranges impacted by the configuration change instructions; comparing the one or more IP addresses or IP address ranges to a weighted list of IP addresses and IP address ranges to identify one or more matching IP addresses or IP address ranges; and computing the weighted impact based on one or more weights associated with the one or more matching IP addresses or IP address ranges; determining, by the centralized network management system, whether the weighted impact of the configuration change instructions exceeds a threshold impact level; and in response to determining that the weighted impact does not exceed the threshold impact level, causing the configuration change instructions to be executed.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
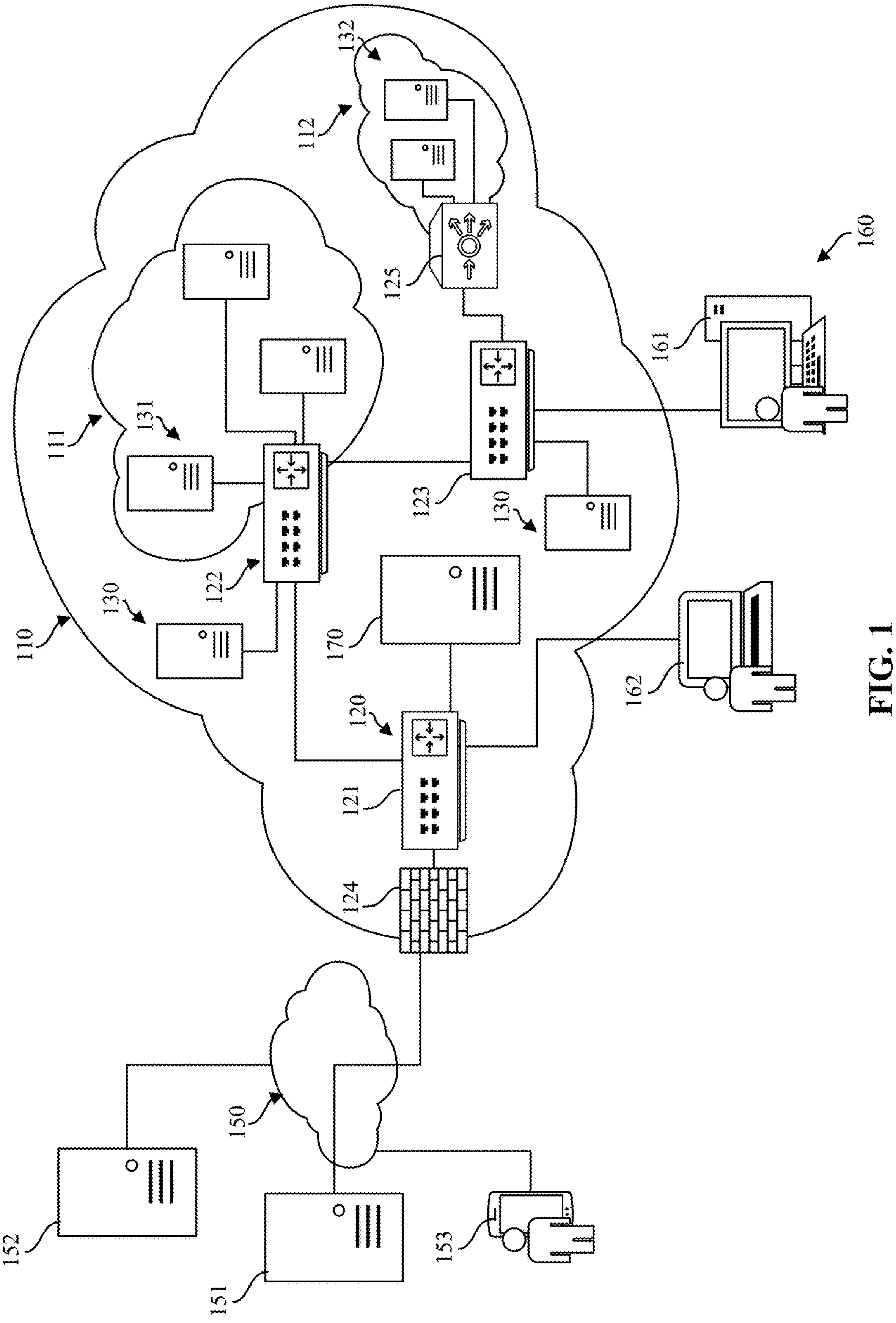
FIG. 1 is a schematic diagram depicting a network managed by a centralized network management system according to one embodiment of the present disclosure.

In the following detailed description, only certain exemplary embodiments of the present invention are shown and described, by way of illustration. As those skilled in the art would recognize, the invention may be embodied in many different forms and should not be construed as being limited to the embodiments set forth herein.

Centralized network management and software deployment systems are often used in various computer network environments. Examples of such systems include Ansible®, Puppet®, network management software (NMS) such as software provided by SolarWinds®, or other deployment and rollout managers. Such centralized network management and software deployment systems improve efficiency and responsiveness, because network engineers and other individuals working to maintain the networks can deploy (or "push") configuration changes to network hardware (e.g., routers and switches) and update software applications (e.g., deploy new versions of web applications, operating systems, containers, virtual machines, and the like) automatically and programmatically throughout a network work, without requiring extensive manual work, such as physically reconnecting cables, physically installing hardware, and/or manually updating configuration settings or installing software pages on each individual computing device that is to be updated.

However, these changes in configuration may have unintended and sometimes harmful or negative impacts on network conditions and network activities. For example, the configuration changes may have misconfigurations (e.g., errors introduced by the engineer when writing the configuration change), issues with automation processes, problems in the order in which changes are rolled out, intentional harm by bad actors, or the like. These configuration changes may cause loss of connectivity to some or all of the network and/or loss of access to some services provided by computing devices connected to the network. While these issues are usually eventually corrected, the intervening downtime generally results in some damage to those dependent on the network or the services provided by the network (e.g., economic harm). As some examples, a network outage at a social media service may result in the loss of advertising revenue and potential sales made through advertisements while the network is down. Likewise, a network outage at an email service provider may result in significant delays or loss of a communications channel for users of the email service provider.

Aspects of embodiments of the present disclosure relate to systems and methods for automatically analyzing configuration changes made through centralized software and/or network management systems and detecting, prior to applying the configuration changes, that the configuration changes may impact important networks or large portions of the network. In some embodiments, systems and methods according to embodiments of the present disclosure detect circumstances where the configuration changes would negatively impact access to portions of the network or disable access to services within the network.

FIG. 1 is a schematic diagram depicting a network managed by a centralized network management system according to one embodiment of the present disclosure. As shown in FIG. 1, a network 110 may include a variety of network hardware 120, such as routers (e.g., first, second, and third routers 121, 122, and 123), firewalls (e.g., firewall 124), and load balancers (e.g., load balancer 125) and a plurality of computing devices (e.g., servers 130, end-user devices 160 such as desktop computer 161 and laptop computer 162). The network 110 may include multiple subnets 111 and 112 where computing devices therein (e.g., first servers 131 within first subnet 111 and second servers 132 within second subnet 112) may be assigned IP addresses within particular IP address ranges (e.g., classless inter-domain routing or CIDR ranges) corresponding to the subnets.

The network 110 may be connected to other networks 150 and communicate with other computing devices (e.g., external server 151, external server 152, or external end-user computing device 153 such as a smartphone) via the other networks 150.

In some embodiments, some or all of the network hardware 120 and/or the computing devices 130 can be configured through a centralized network management system 170, which may run on a computing device (e.g., a server) within the network 110.

Figure 2:
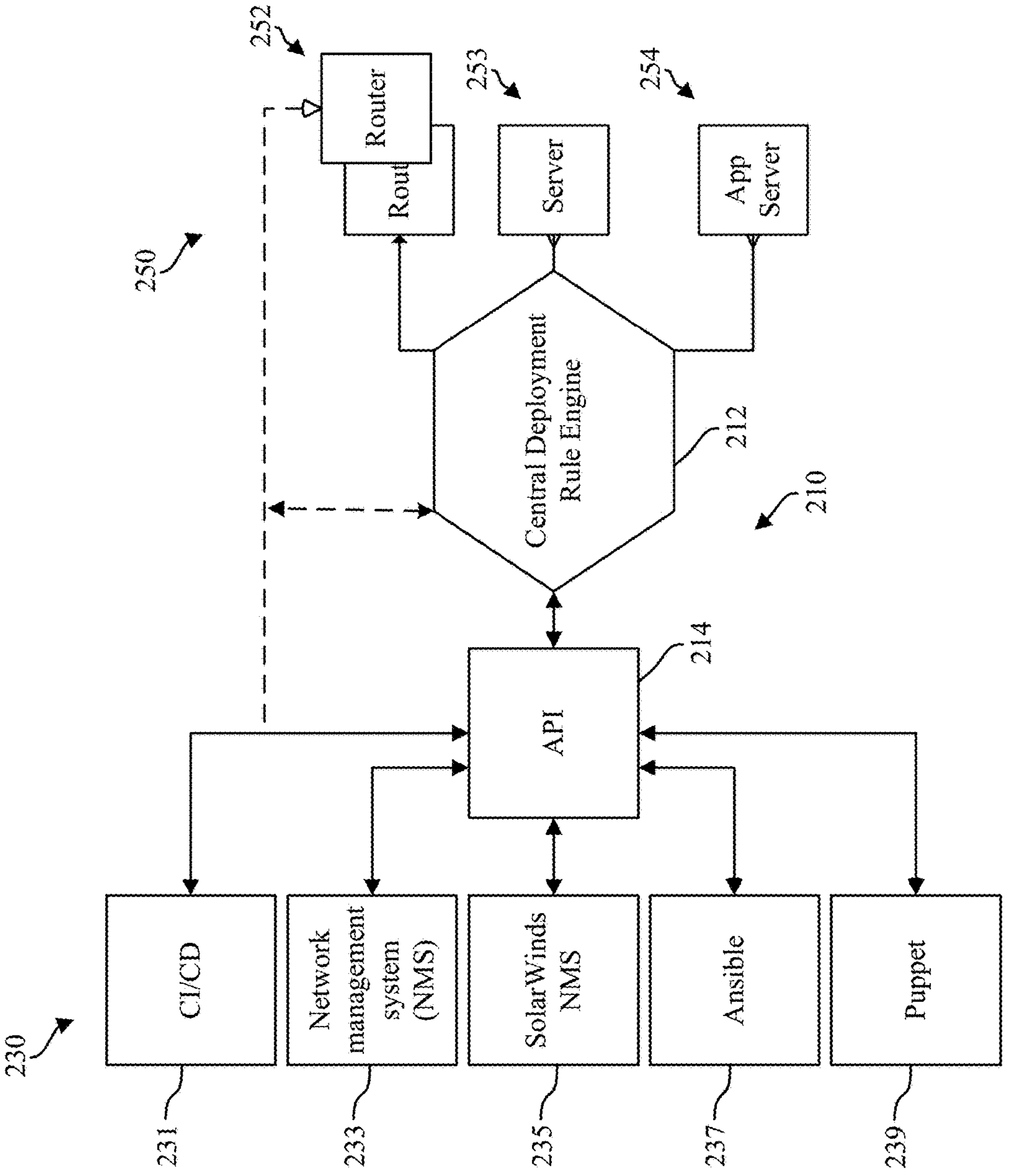
FIG. 2 is a schematic diagram depicting the centralized configuration of network hardware and computing devices according to one embodiment of the present disclosure.

FIG. 2 is a schematic diagram depicting the centralized configuration of network hardware and computing devices according to one embodiment of the present disclosure. As shown in FIG. 2, a centralized network management system 210 (which may comprise one example of centralized network management system 170) includes a deployment rule engine 212 and an application programming interface (API) 214 for accessing the deployment rule engine 212. The API 214 is configured to receive configuration change instructions 230 that are used to make changes in network hardware, servers, and other components or network resources 250 of the network, such as routers 252, servers 253 (e.g., managing the configuration of virtual machines and/or containers), and application servers 254 (e.g., managing the configurations of software applications running on virtual machines or in containers).

Figure 3:
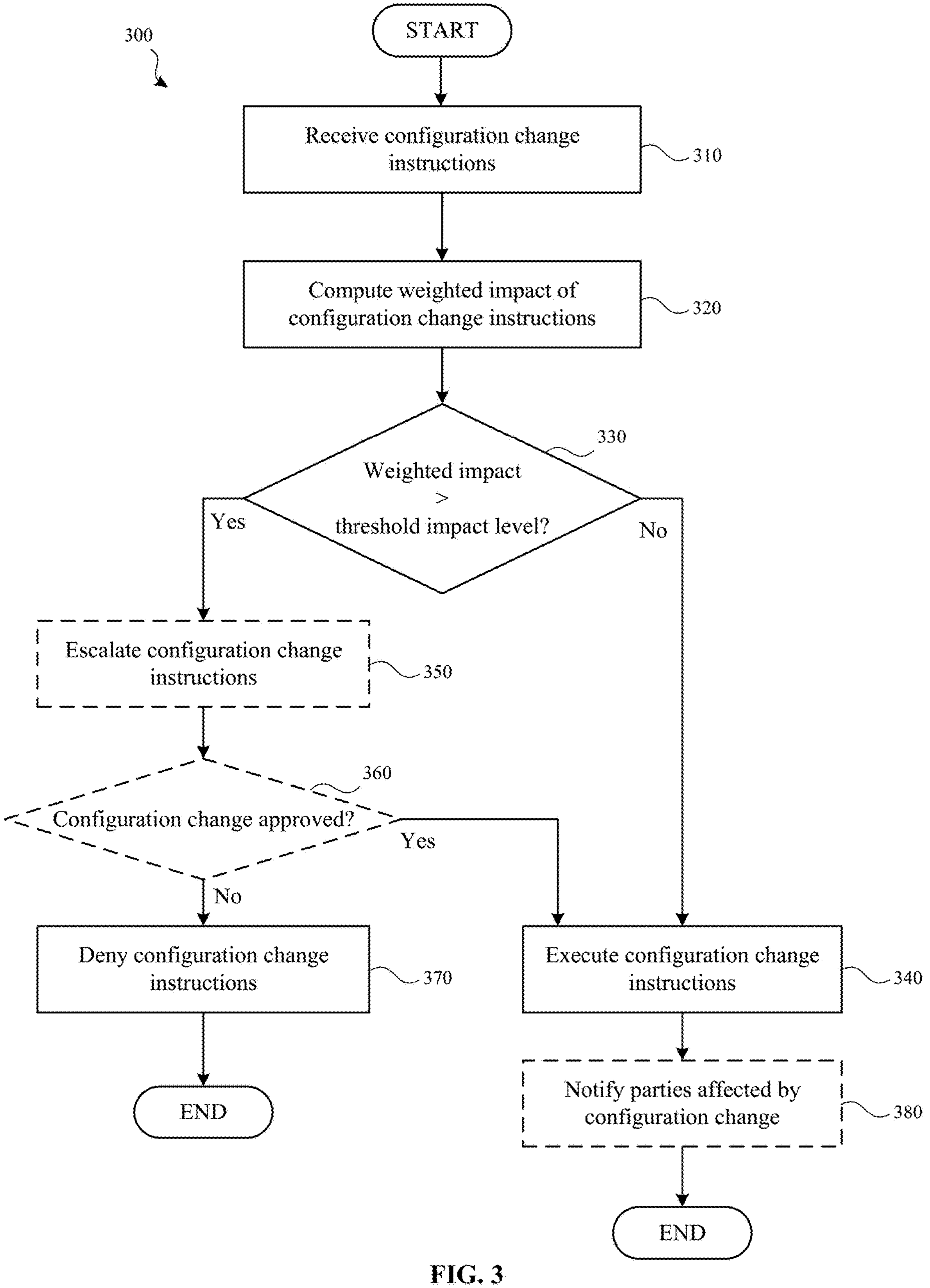
FIG. 3 is a flowchart of a method for evaluating a configuration change based on rules according to one embodiment of the present disclosure.

FIG. 3 is a flowchart of a method for evaluating a configuration change based on rules according to one embodiment of the present disclosure. In operation 310, the centralized network management system 210 receives configuration change instructions 230, e.g., from a network engineer using a computing device 161.

As shown in FIG. 2, the configuration change instructions 230 may be provided in any of a number of different data formats or structures based on the software tool that is being used to perform the deployment. Examples of software tools or categories of software tools include continuous integration/continuous deployment (CI/CD) tools 231 (e.g., Jenkins®, CircleCI®, Travis CI®, and the like), network management system (NMS) A 233 and NMS B 235 (such as SolarWinds NMS), configuration management system A 237 (such as Ansible®), and configuration management system B 237 (such as Puppet®), although embodiments of the present disclosure are not limited thereto.

For example, in the case of a CI/CD tool 231, the configuration change may refer to a particular version of source code (e.g., a particular commit within a source code repository managed by a version control system), where the CI/CD tool 231 would typically compile the software (if needed), run automated tests on the software (e.g., unit tests and integration tests), and, in a case where the version of the software passed all of the tests, the CI/CD tool 231 would deploy the software to one or more application servers. In contrast, in embodiments of the present disclosure, prior to deployment, the version of the source code is also provided to the central deployment rule engine 212, which is configured to perform additional analysis on the version of the software to be deployed.

In operation 320, the deployment rule engine 212 computes a weighted impact of the configuration change instructions. Generally speaking, configuration change instructions may directly or indirectly impact various network resources 250, such as network hardware (e.g., routers, switches, firewalls, software defined networking hardware, load balancers, etc.) as well as services running on computing devices within the network (e.g., web applications, authentication services, data storage services, caches, and the like). In many circumstances, the line between network hardware and services running on computing devices may be unclear, such as network operations performed by computing devices (e.g., a server computing device operating as a router), and therefore the terms used herein are not intended to refer to disjoint categories of devices or network resources that may be configured by configuration change instructions 230 within the scope of the disclosure.

Direct impacts may refer to changes made directly to the network resources 250 themselves, such as changes to static IP addresses, hostnames, installed versions of application software, configuration of servers (e.g., operating system versions, installed software, network configuration settings, permissions settings, etc.), configuration settings of application software (e.g., hostnames or IP addresses of network services used by application software, coordination servers, phased deployment operations, etc.), and the like. In the case of network hardware, these direct configuration changes may include settings such as static routes, gateways, firewall configurations, network filters, subnets, permissions, virtual private networks, and the like.

Indirect impacts refer to changes to network resources that are detectable by other network resources. For example, the change of a hostname or IP address of a shared service may be detectable by other systems (e.g., which may temporarily fail to connect to the service until the other systems learn the new IP address of the service). As another example, changes to settings in a router may affect the connectivity of devices connected to the router and/or the ability of network traffic to be sent to and from the devices connected to the router.

As such, misconfigurations in these settings may cause direct impacts in that the devices themselves may lose connectivity to the network or lose connectivity to services that they depend upon for normal operation. In addition, misconfigurations in these settings may also have indirect impacts on other systems that depend on services provided by these network resources. For example, the misconfiguration of an authentication server may prevent end users and other devices from connecting to the network and, in some cases, may physically block users from entering buildings that are secured by the authentication systems that depend on the authentication server. As another example, changing network filter settings on a router (e.g., resource public key infrastructure (RPKI) configuration, firewall configurations, etc.) may impact one or more subnets connected to the router.

Accordingly, in some embodiments of the present disclosure, the deployment rule engine 212 computes a weighted impact of the configuration change instructions based on one or more factors or features extracted from or otherwise associated with the configuration change instructions. In some examples, these factors or features include, but are not limited to: the IP addresses, IP address ranges (e.g., subnets or classless inter-domain routing (CIDR) ranges) directly or indirectly affected by the configuration change instructions; the volume of network traffic sent and/or received by the IP addresses, subnets, and/or services impacted by change; the importance of the services impacted by the change (e.g., low traffic but critical services); and the like. In some embodiments, these factors, such as volume of network traffic, are computed through network traffic information (e.g., collected from routers and other monitoring devices in the network 110 using the NetFlow protocol). Accordingly, the weights assigned to IP addresses and/or IP address ranges or CIDR ranges and/or to particular services running on the network may be weighted based on information from prior activity (e.g., the historical weight or prior weight of the network resources, as inferred from prior data such as network activity). The weighting of a subnet provides an indication of the impact an outage of the subnet. This weighting is calculated and analyzed dynamically and broken further into sub-aggregations in order to identify smaller networks with potentially large impacts.

In some embodiments, the deployment rule engine 212 computes the weighted impact by comparing the IP addresses and/or subnets impacted by the configuration change instructions to a weighted list of IP addresses and/or subnets (e.g., CIDR ranges). In some examples, the IP addresses and/or subnets impacted by the configuration change are matched with IP addresses and/or subnets on the list (e.g., compared to determine overlapping ranges of IP addresses) and the weights of all matching IP addresses and/or subnets are combined (e.g., added together or a maximum value taken from the weights) to compute a weighted impact of the configuration change. The weights of the subnets in the weighted list of subnets may be computed based on the activity levels of those subnets based on factors such as those described above. In some embodiments, the weights of the subnets are manually specified by network engineers based on evaluations of network activity information and based on information provided by users (e.g., customers) of network resources 250 internal to the network 110 and based on information from users of external networks 150.

In some embodiments, the deployment rule engine 212 computes the weighted impact of the configuration change using one or more statistically trained models (e.g., machine learning models), where the models are trained based on training data collected from the network or other networks, as described in more detail below with respect to FIG. 4.

In operation 330, the deployment rule engine 212 determines if the weighted impact is greater than a threshold impact level. If the weighted impact of the change does not satisfy the threshold impact level (e.g., the calculated weighted impact is low), then, in operation 340, the deployment rule engine 212 executes the configuration change instructions to implement the changes to the corresponding hardware and/or software of the network resources 250. This may include, for example, providing the configuration change instructions to the corresponding centralized software tool to execute the change instructions. In the case of configuration change instructions for a CI/CD system, such as CI/CD system 231, executing the instructions may cause the CI/CD system to proceed with the deployment by installing the software on an application server 254. In the case of an NMS, such as NMS A 233 or NMS B 235, executing the configuration changes may propagate the specified changes to the routers 252. In the case of configuration management system A 237 or configuration management system B 239, corresponding configuration changes may be applied to servers 253.

In operation 350, if the weighted impact of the change does satisfy the threshold impact level (e.g., is greater than the threshold impact level), then, in some embodiments, the deployment rule engine 212 escalates the configuration change. In some embodiments, escalating a change may include generating a notification (e.g., an in-application alert, an email alert, a text message, or the like) to a higher-level network engineer user account or other user account having authority to approve the configuration change (e.g., to a laptop 162 associated with a higher-level user). In some examples, the role of the higher-level user account may depend on the computed weighted impact of the change (e.g., changes with lower weighted impacts may be signed-off by a senior network engineer while changes with higher weighted impacts may need to be signed off by a vice president-level user).

In some examples, the notification provides the higher-level user account with access to information about the configuration change instructions, the detected impacted network resources (e.g., impacted subnets, impacted services, or the like), and the like. Accordingly, the higher-level user associated with the higher-level user account reviewing the notification is presented with information for manually analyzing the proposed configuration change. The user may then approve or deny the configuration change instructions based on the risk and impact on the network resources.

In some embodiments, the deployment rules engine 212 relaxes or removes the requirements for sign-off by a higher-level user account when the deployment rules engine 212 determines that particular conditions requiring urgent response are required. Examples of conditions requiring urgent response include, for example, known distributed denial of service (DDoS) attack conditions, in which case configuration changes corresponding to standard, effective mitigations for DDOS attacks may be automatically executed or may be subjected to lower levels of sign-off, despite a high weighted impact. Additional examples of conditions requiring urgent response may include other sudden changes in network conditions from typical conditions, such as when external configuration changes (e.g., at another network 150) significantly impact connectivity of users within the network 110 to external resources.

In operation 360, the deployment rule engine 212 determines if the configuration change was approved. If so, then it proceeds to execute the configuration change instructions in operation 340. If not, then in operation 370 the deployment rule engine 212 denies the configuration change instructions.

In some embodiments, if the weighted impact of the change does satisfy the threshold impact level (e.g., is greater than the threshold impact level), then the deployment rule engine 212 proceeds directly to denying the configuration change instructions without escalating the configuration change.

In some embodiments, in operation 380, the deployment rule engine 212 automatically notifies parties responsible for particular network resources, subnets, and/or external networks that may be impacted by the changes, such as by sending notification messages to accounts associated with the responsible parties. For example, a configuration change may potentially affect connections to a particular external network, such as by modifying routes to the external network. If the configuration change instructions are implemented correctly, then no loss of connectivity is expected. However, errors in the configuration change instructions may cause a loss of connectivity to some or all portions of the external network. Likewise, configuration changes may cause disruption in access to services provided by particular network resources 250 of the network 110. Accordingly, in some examples, operators of the affected external networks, internal network resources, and the like are notified by the deployment rule engine 212 to watch for potential changes and/or service degradations that may arise from the configuration change. For example, Google® runs a popular alternative public domain name service (DNS) server, available at the 8.8.8.8 and 8.8.4.4 IPv4 addresses. Some network configuration change instructions may affect the ability of end-users to connect to these DNS servers, the loss of which may, confusingly and unexpectedly, cause many day-to-day user activities to be interrupted or impossible to perform. In addition, end-users may initially contact their internet service providers (ISP) to report problems with their network connection functionality. As such, notifying the affected external networks (e.g., ISPs connected to the network 110) may provide the ISPs with advance notice of potential network connectivity problems, thereby speeding detection and resolution of those connectivity problems.

In some comparative systems, errors in configuration may be detected primarily via tickets (e.g., technical support tickets) filed by customers and other users of the network 110. This may cause delays in detecting problems or errors caused by changes to the configuration of network resources 250 and correcting the configuration problems to restore correct or expected network behavior. As such, some aspects of embodiments of the present disclosure relate to automatically preventing bad configurations by detecting when proposed configuration change instructions may have a significant and noticeable negative impact on network operations and/or automatically detecting undesirable network conditions and automatically generating support tickets and/or automatically rolling back (undoing) configuration changes.

Figure 4:
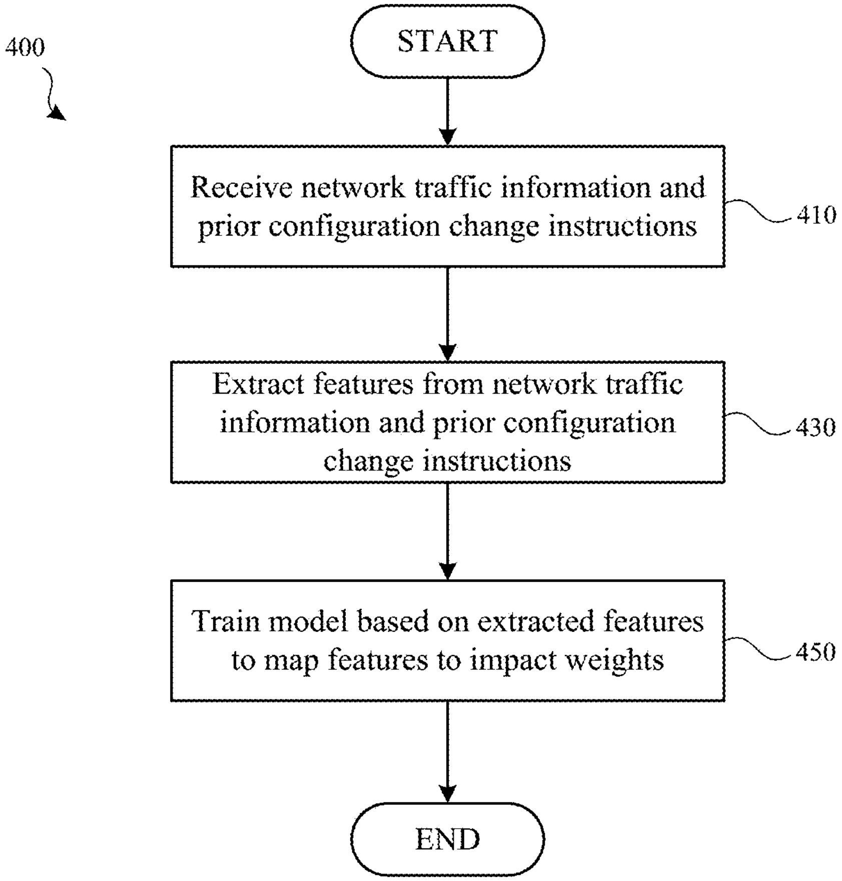
FIG. 4 is a flowchart of a method for automatically generating models for computing weighted impacts based on observed network conditions according to one embodiment of the present disclosure.

FIG. 4 is a flowchart of a method 400 for automatically generating models for computing weighted impacts based on observed network conditions according to one embodiment of the present disclosure. The operations of method 400 may be performed by a model trainer running on a computing device having access to training data collected from the network 110, such as computing device 170 or another server 130 or end-user device 160 connected to the network 110.

In operation 410, the model trainer receives model training data such as network traffic information and prior configuration change instructions. As noted above, in some embodiments, the model trainer receives network traffic information (e.g., collected by routers and other network monitoring devices using the NetFlow protocol, the Internet Protocol Flow Information Export (IPFIX) protocol, or other network monitoring protocols). The collected network traffic information can then be analyzed to detect high traffic subnets and important IP addresses, such as detecting the top 100 or top 1% of IP addresses and/or CIDRs (where the specific number may depend on the size of the network and/or the distribution of traffic among different IP addresses and/or CIDRs of the network 110).

In the case where the model is a weighted list of IP addresses or CIDRs, then in operation 430, the model trainer assigns the various IP addresses and/or CIDRs of the network with weights that are computed based on the volume of network traffic received by the services. As noted above, these weights may also be modified (e.g., increased or decreased) based on manually specified values, such as IP addresses or CIDRs being specifically marked as hosting particularly important services (e.g., entry points, authentication servers, DNS servers, or the like).

In the case where the model is a weighted list of IP addresses or CIDRs, in operation 450 the model trainer outputs a weighted list of IP addresses and/or CIDRs with the corresponding weights as computed in operation 430. In some embodiments, the list is ordered by weight (e.g., with highest weight IP addresses and/or CIDRs listed first). This weighted list of IP addresses or CIDRs may then be used by the deployment rule engine 212 to automatically compute the weight impact of configuration changes.

In some embodiments of the present disclosure, the method 400 is applied to training a statistical model or machine learning model based on collected data. Examples of machine learning models include, but are not limited to, a support vector machine (SVM), a neural network, a deep neural network (e.g., a neural network having more than one hidden layer, a recurrent neural network, a long-short term memory neural network, or the like).

As before, in operation 410, the model trainer receives training data such as network traffic information and prior configuration change instructions. In some embodiments of the present disclosure, the training data includes samples that include configuration change instructions and the associated support tickets that were opened due to the change event (e.g., that were opened after the configuration change instructions were executed and that are connected to services impacted by the configuration change instructions). In some embodiments, the training data includes network traffic information as discussed above (e.g., information collected via the NetFlow and/or IPFIX protocols) after configuration change instructions were executed (and, in some cases, traffic data from before the change instructions were executed).

In operation 430, the model trainer extracts features from the training data. Such features may include, for example, data specified in the network change instructions such as: IP addresses and CIDR ranges; names of services running on network hardware; versions of software; names of network applications; and the like.

In some embodiments, the model trainer extracts labels associated with the data samples (e.g., associated with a particular set of configuration change instructions) based on the network traffic information, such as volume of traffic, type of network traffic (e.g., based on port numbers, protocols, content of data packets as determined by deep packet inspection, etc.), the most common IP addresses that various services communicate with, and the like. As a more specific example, if the volume of traffic to particular IP addresses drops significantly after a configuration change, the drop in network traffic might be due to that configuration change, in which case the configuration change instructions of the training example may be associated with a high weighted impact for the particular affected IP addresses. In some examples, the model trainer extracts labels associated with the data samples based on associated support tickets, such as severity levels, affected services, and/or affected IP addresses or CIDR ranges associated with the configuration change instructions. In addition, in some embodiments, the labels are further augmented with manually specified information, such as manually specified IP addresses, IP address ranges (e.g., subnets associated with CIDR ranges), and/or services that are known to host important or high-value services (e.g., as specified by a customer).

In operation 450, the model trainer trains a statistical model or machine learning model based on the extracted features to map features to weighted impacts. In particular, the model is trained to predict the weighted impact of a particular set of configuration change instructions based on the collected training data showing the impact of prior configuration change instructions on various network resources (e.g., as indicated by changes in network traffic and/or support tickets that were filed due to the change). The resulting statistical model may then be used by the deployment rules engine 212 to compute predictions of the weighted impact of configuration change instructions prior to executing those configuration change instructions, as described above with respect to FIG. 3.

In some embodiments, the operations of method 400 of FIG. 4 are performed periodically and/or continuously in order to update the calculations of the weights in response to changing conditions in the network 110, such as the addition or removal of new customers in various CIDRs or subnets of the network 110, addition or removal of important services and routers within the network 110, and the like.

Some aspects of embodiments also relate to automatic backout or rollback of configurations in the case of the deployment of a configuration that causes undesired and unintended changes in the network.

Figure 5:
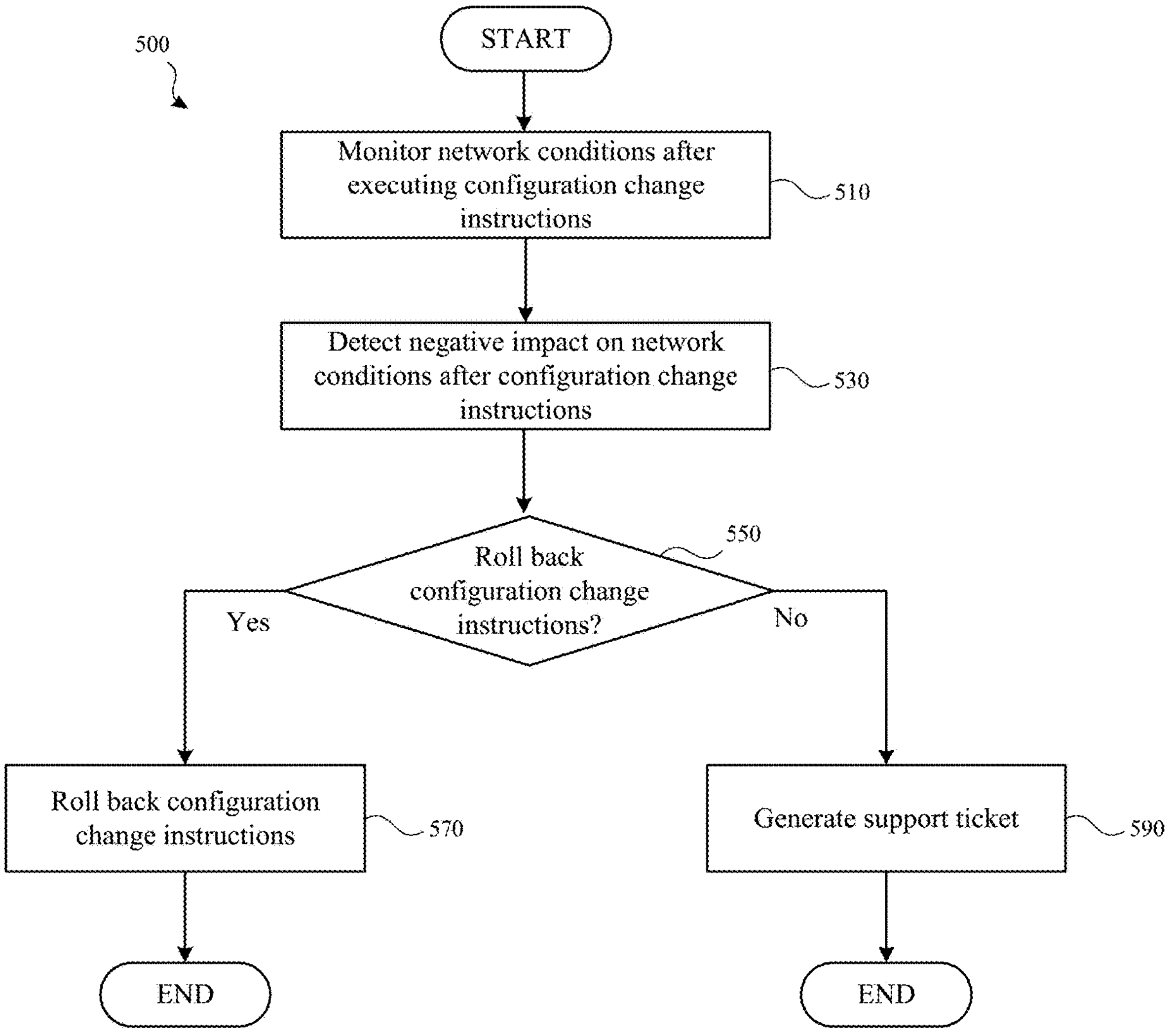
FIG. 5 is a flowchart of a method for detecting problems caused by a deployment based on observed network conditions and rolling back changes or generating support tickets according to one embodiment of the present disclosure.

FIG. 5 is a flowchart of a method 500 for detecting problems caused by a deployment based on observed network conditions and rolling back changes or generating support tickets according to one embodiment of the present disclosure.

In operation 510, the deployment rule engine 212 monitors network conditions after executing configuration change instructions (e.g., previously executed in operation 340 of FIG. 3). The monitoring of network conditions may include, for example, monitoring network traffic using NetFlow or IPFIX data received from routers and other monitoring devices in the network 110, monitoring the reachability of external networks 150 and subnets 111 and 112 from locations within the network 110, and monitoring the health and reachability of network services within the network (e.g., confirming that network services and applications are reachable and responding to heartbeat messages).

In operation 530, the deployment rule engine 212 detects a negative impact on network conditions after the configuration change. Examples of negative impacts include, for example, sudden drops in network traffic, sudden increases in network traffic (e.g., to the point of overloading one or more network resources), sudden triggering of fallback or backup systems (e.g., failing over to backup routes), loss of connectivity or responsiveness in network resources (e.g., timeouts from services in response to heartbeat messages or standard requests to application servers), and the like. In operation In operation 550, the deployment rule engine 212 determines whether to roll back the configuration change. In some circumstances the decision as to whether to roll back the configuration may depend on the nature of the configuration change itself, such as whether the change is permanent (e.g., cannot be automatically rolled back or would be difficult to roll back, such as a database migration or a change where multiple other critical services are already dependent on the new configuration), or whether the change can be undone (e.g., redeploying an older version of an application, reverting to an earlier version of a containerized application, restoring previous configuration settings, etc.). If the change can be rolled back, then in operation 570 the deployment rule engine 212 automatically rolls back the configuration change, such as by executing configuration instructions that remove the previous settings (e.g., applying a declarative configuration corresponding to the state of the network resources prior to the configuration change instructions that caused the negative impact).

In circumstances where an automatic roll back of the configuration change instructions is not appropriate (e.g., difficult or impossible) or in response to determining to refrain from rolling back the configuration change instructions, the deployment rule engine 212 automatically generates a support ticket in operation 590 to notify network engineers of the detected problem such that the detected problem can be addressed manually.

Accordingly, aspects of embodiments of the present disclosure relate to systems and methods for automatically computing the potential impact of configuration changes in computer networks. Some aspects relate to escalating the requests to change configuration settings if the computed impact exceeds a threshold level, such that multiple network engineers can review the changes before they are executed. Some aspects also relate to notifying responsible parties who may be impacted by the network changes such that any negative impact can be addressed in a timely manner. Some aspects further relate to training machine learning models or statistical to automatically compute the weighted impact of a configuration change instruction, where the model is trained based on prior configuration change instructions and the impact of such changes on network operations (e.g., traffic flow and service availability). Some aspects of embodiments further relate to monitoring network conditions after execution of the configuration change instructions and rolling back the changes or automatically generating a support ticket in the case of a negative impact due to the configuration changes.

Figure 6:
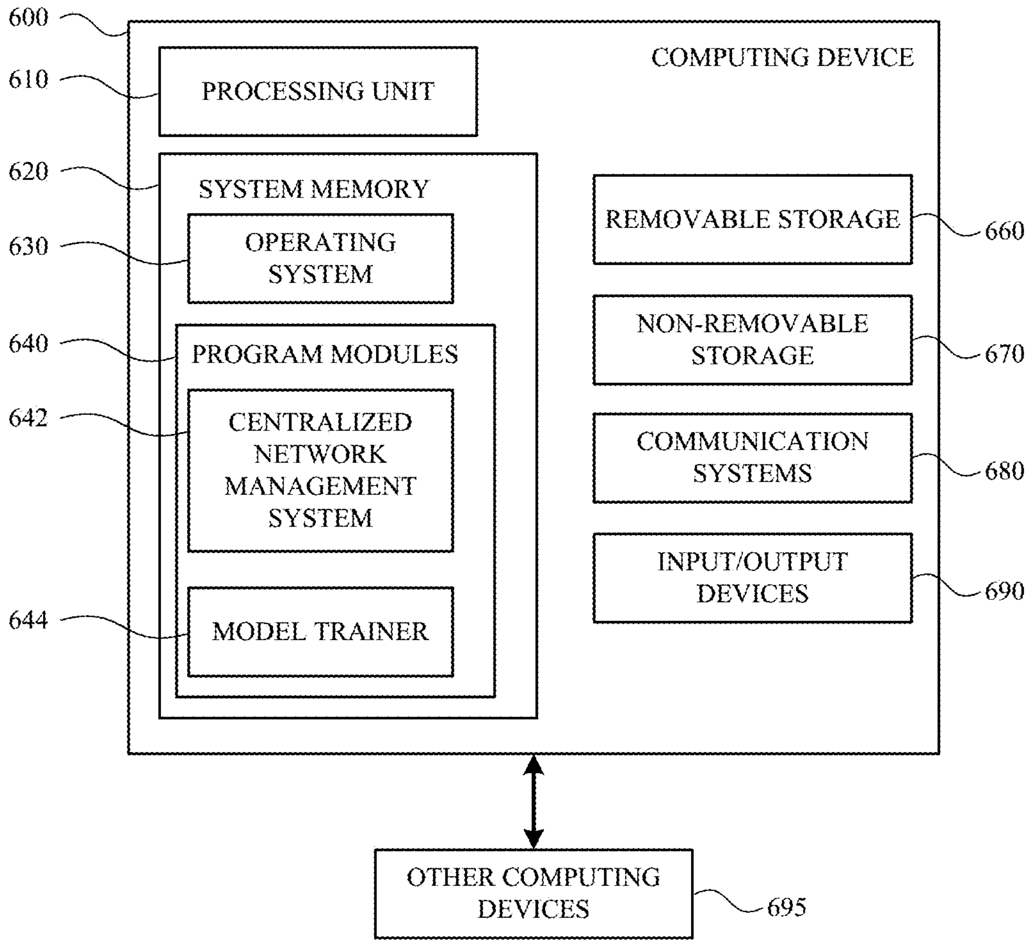
FIG. 6 is a block diagram of a computing device according to one embodiment of the present disclosure.

FIG. 6 is a system diagram of a computing device 600 according to an example. The computing device 600, or various components and systems of the computing device 600, may be integrated or associated with, for example, a computing device, a centralized network management system, a software defined network router, or a network monitoring device, shown and described herein. As shown in FIG. 6, the physical components (e.g., hardware) of the computing device are illustrated and these physical components may be used to practice the various aspects of the present disclosure.

The computing device 600 may include at least one processing unit 610 and a system memory 620. The system memory 620 may include, but is not limited to, volatile storage (e.g., random access memory), non-volatile storage (e.g., read-only memory), flash memory, or any combination of such memories. The system memory 620 may also include an operating system 630 that controls the operation of the computing device 600 and one or more program modules 640 that may execute a centralized network management software 642 providing a centralized network management system 170. The program modules 640 may be responsible for providing and/or generating a user interface to a computing device, a model trainer 644 for training a model for predicting the weighted impact of configuration change instructions as described above, where different devices, such as the routers 120, the servers 130, the centralized network management system 170, and the like, may have program modules 640 stored in the memory. A number of different program modules and data files may be stored in the system memory 620. While executing on the processing unit 610, the program modules 640 may perform the various processes described above.

The computing device 600 may also have additional features or functionality. For example, the computing device 600 may include additional data storage devices (e.g., removable and/or non-removable storage devices) such as, for example, solid state drives, magnetic disks, optical disks, or tape. These additional storage devices are labeled as a removable storage 660 and a non-removable storage 670.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 6 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 600 on the single integrated circuit (chip). The disclosure may also be practiced using other technologies capable of performing logical operations such as, for example, AND, OR, and NOT, including but not limited to mechanical, optical, fluidic, and quantum technologies.

The computing device 600 may include one or more communication systems 680 that enable the computing device 600 to communicate with other computing devices 695 such as, for example, routing engines, gateways, signings systems and the like. Examples of communication systems 680 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc. The communication systems 680 may be implemented by one or more network adapters, such as a smart network interface card (smart NIC).

The computing device 600 may also have one or more input devices and/or one or more output devices shown as input/output devices 690. These input/output devices 690 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 620, the removable storage 660, and the non-removable storage 670 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media is tangible and non-transitory and does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Further, as used herein and in the claims, the phrase "at least one of element A, element B, or element C" is intended to convey any of: element A, element B, element C, elements A and B, elements A and C, elements B and C, and elements A, B, and C.

It should be understood that the sequence of steps of the processes described herein in regard to various methods and with respect various flowcharts is not fixed, but can be modified, changed in order, performed differently, performed sequentially, concurrently, or simultaneously, or altered into any desired order consistent with dependencies between steps of the processes, as recognized by a person of skill in the art.

It should be understood that the sequence of steps of the processes described herein in regard to various methods and with respect various flowcharts is not fixed, but can be modified, changed in order, performed differently, performed sequentially, concurrently, or simultaneously, or altered into any desired order consistent with dependencies between steps of the processes, as recognized by a person of skill in the art.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for controlling deployment of network configuration changes, comprising:

receiving, by centralized network management system executed by a processor and memory, configuration change instructions to alter a configuration of a network;

computing, by the centralized network management system, a weighted impact of the configuration change instructions;

determining, by the centralized network management system, whether the weighted impact of the configuration change instructions exceeds a threshold impact level; and in response to determining that the weighted impact does not exceed the threshold impact level, causing the configuration change instructions to be executed, wherein the weighted impact of the configuration change instructions is computed by supplying features extracted from the configuration change instructions to a trained machine learning model, and wherein the trained machine learning model is trained based on prior configuration change instructions and associated network traffic data collected after applying the prior configuration change instructions.

2. The method of claim 1, further comprising, in response to determining that the weighted impact exceeds the threshold impact level, denying the configuration change instructions.

3. The method of claim 1, further comprising, in response to determining that the weighted impact exceeds the threshold impact level, escalating the configuration change instructions to a higher-level user account.

4. The method of claim 3, further comprising:

receiving an approval of the configuration change instructions from the higher-level user account; and causing the configuration change instructions to be executed based on the approval.

5. The method of claim 1, further comprising:

sending notification messages to accounts associated with parties responsible for network resources impacted by the configuration change instructions.

6. The method of claim 1, wherein the trained machine learning model is further trained based on one or more support tickets that were generated due to the prior configuration change instructions.

7. The method of claim 1, further comprising:

monitoring a plurality of network conditions of the network after executing the configuration change instructions;

detecting a negative impact on the network conditions after the executing the configuration change instructions;

determining whether to roll back the configuration change instructions; and rolling back the configuration change instructions in response to determining to roll back the configuration change instructions.

8. A system for controlling deployment of network configuration changes, comprising:

at least one processor; and memory, operatively connected to the at least one processor and storing instructions that, when executed by the at least one processor, cause the system to:

receive configuration change instructions to alter a configuration of a network;

compute a weighted impact of the configuration change instructions;

determine whether the weighted impact of the configuration change instructions exceeds a threshold impact level; and in response to determining that the weighted impact does not exceed the threshold impact level, execute the configuration change instructions, wherein the weighted impact of the configuration change instructions is computed by supplying features extracted from the configuration change instructions to a trained machine learning model, and wherein the trained machine learning model is trained based on prior configuration change instructions and associated network traffic data collected after applying the prior configuration change instructions.

9. The system of claim 8, wherein the memory further stores instructions that, when executed by the at least one processor cause the system to, in response to determining that the weighted impact exceeds the threshold impact level, escalate the configuration change instructions to a higher-level user account.

10. The system of claim 9, wherein the memory further stores instructions that, when executed by the at least one processor cause the system to:

receive an approval of the configuration change instructions from the higher-level user account; and execute the configuration change instructions based on the approval.

11. The system of claim 8, wherein the memory further stores instructions that, when executed by the at least one processor cause the system to:

monitor a plurality of network conditions of the network after executing the configuration change instructions;

detect a negative impact on the network conditions after the executing the configuration change instructions;

determine whether to roll back the configuration change instructions; and roll back the configuration change instructions in response to determining to roll back the configuration change instructions; and generate a support ticket in response to determining to refrain from rolling back the configuration change instructions.

* * * * *